A. A. OLSON.
TWO SPEED GEARING.
APPLICATION FILED JAN. 31, 1913.

1,099,464.

Patented June 9, 1914.
2 SHEETS—SHEET 1.

Witnesses
Francis Boyle

Inventor
A. A. OLSON
by Chandler Bandler
Attorneys

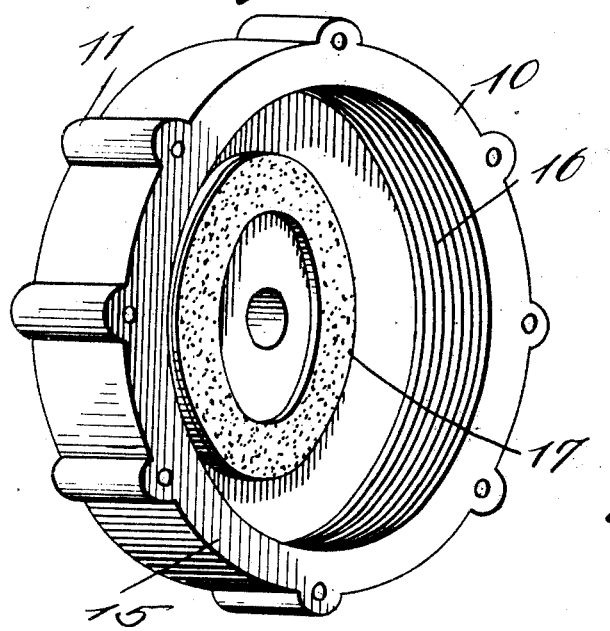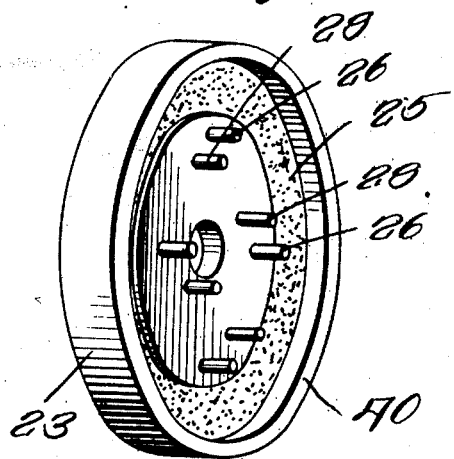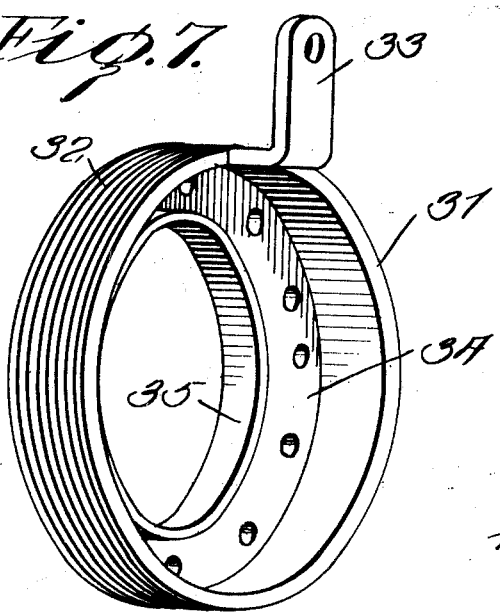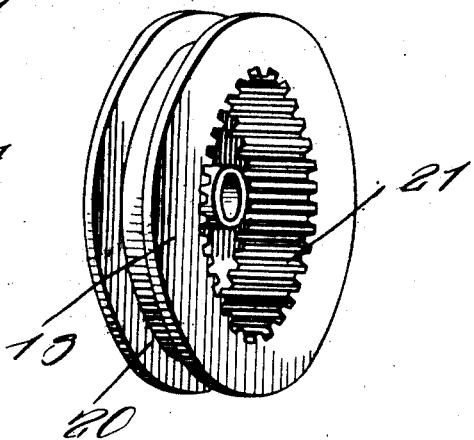

UNITED STATES PATENT OFFICE.

AMES A. OLSON, OF HERNDON, KANSAS.

TWO-SPEED GEARING.

1,099,464.   Specification of Letters Patent.   Patented June 9, 1914.

Application filed January 31, 1913. Serial No. 745,503.

*To all whom it may concern:*

Be it known that I, AMES A. OLSON, a citizen of the United States, residing at Herndon, in the county of Rawlins, State of Kansas, have invented certain new and useful Improvements in Two-Speed Gearing; and I do hereby declare the following to be a full, clear, and exact description of the invention, such as will enable others skilled in the art to which it appertains to make and use the same.

This invention relates to clutches for motorcycles and has for an object to provide a two-speed clutch that will be composed of a few number of simple parts that will not easily get out of order.

A further object of the invention is to provide a two-speed clutch that will be light and strong and will be effective in operation under all conditions of service.

With the above objects in view the invention consists of certain novel details of construction and combination of parts hereinafter fully described and claimed, it being understood that various modifications may be made in the minor details of construction within the scope of the appended claims.

Figure 1:
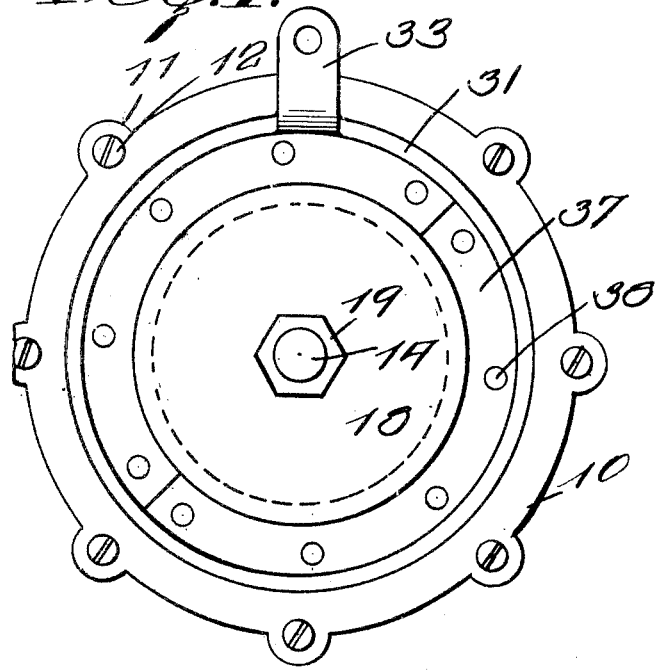
Figure 2:
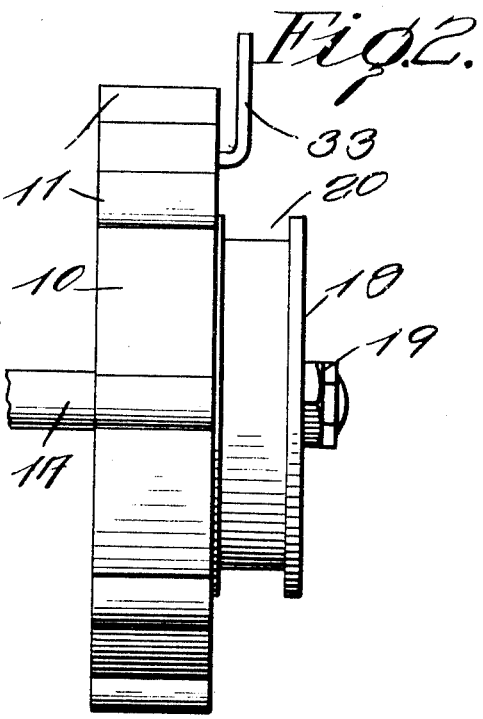
Figure 3:
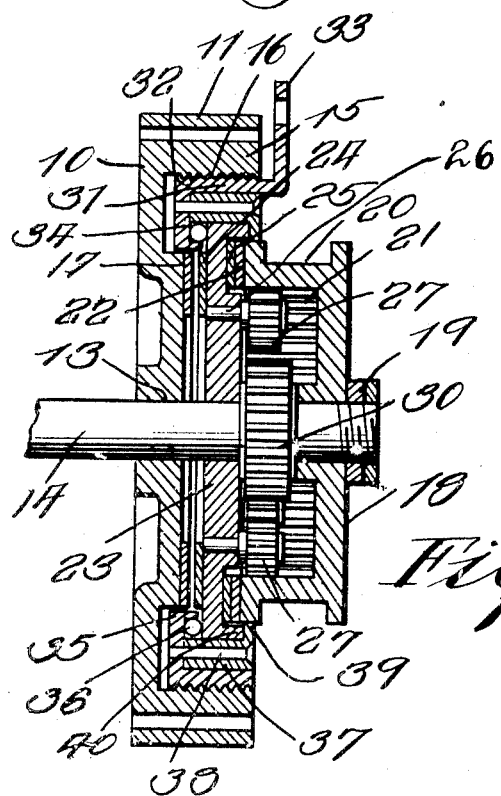
Figure 4:
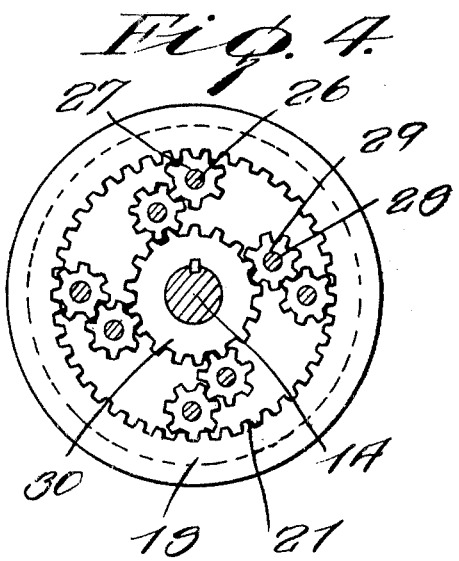

In the accompanying drawings forming part of this specification:—Figure 1 is a side elevation of the clutch. Fig. 2 is an end elevation of the clutch. Fig. 3 is a vertical cross sectional view through the clutch. Fig. 4 is a rear view of the pulley. Fig. 5 is a detail perspective view of the clutch disk. Fig. 6 is a detail perspective view of the base block. Fig. 7 is a detail perspective view of the shifting ring. Fig. 8 is a detail perspective view of the pulley.

Referring now to the drawings in which like characters of reference designate similar parts, 10 designates a base block which is provided with marginal perforated lugs 11 through which screws 12 are passed for securing the block to the motor or machine. The block is provided with a central opening 13 to loosely receive the motor shaft 14 and is further formed with an annular flange 15 which is internally provided with screw threads 16. A friction ring 17 of leather or other suitable material is fixed to the block in concentric relation to the opening 13 and flange 15.

A pulley 18 is loosely mounted on the free end of the shaft and is held in position by retaining nuts 19, this pulley having a grooved periphery 20 to receive the driving belt of the machine. The pulley is provided in the inner face with internal gear teeth 21. A friction ring 22 is arranged on the inner face of the pulley outside of the gear teeth.

A clutch disk 23 is revolubly and slidably mounted on the shaft 14 and is provided on one face with a friction ring 24 adapted to contact with the base block friction ring 17, and on the opposite face with a friction ring 25 adapted to contact with the friction ring 22 of the pulley. The clutch disk is provided with a circular series of pins 26 which project into the pulley and are equipped with loose pinions 27 that mesh with the gear teeth of the pulley. The friction disk is further provided with a second circular series of pins 28 which are equipped with loose pinions 29 that mesh with the pinions 27 and also mesh with a driving gear 30 that is fixed to the shaft 14. This construction is best shown in Fig. 4.

A shifting ring 31 is provided with external screw threads 32 to engage with the screw threads 16 of the base block flange and is equipped with an operating lever 33 adapted to rotate the ring. The ring is provided on the inner face with a flange 34 that projects between the clutch disk 23 and block 10 and is formed with a shoulder 35 which forms a ball race for ball bearings 36 that are disposed between and bear upon the clutch disk and shifting ring flange as shown in Fig. 3. The clutch flange is secured to the shifting ring by means of a retaining ring 37 which fits within the shifting ring and is secured to the latter by means of pins 38 passed through the retaining ring and into the flange 34 of the shifting ring. The retaining ring is provided with a flange 39 that engages with the edge of a peripheral flange 40 formed on the clutch disk and further engages with the peripheral edge of the driving pulley 18 to keep out dust.

When the operating lever 33 is rocked in one direction the shifting ring will be backed out of the threaded base block flange and will carry the clutch disk outwardly until the friction rings of the clutch disk and pulley intimately contact. The clutch disk is now locked to the pulley and turns the latter at the same speed as the shaft 14 is turning. When the operating lever 33 is rocked in the opposite direction the shifting ring will be screwed into the threaded base block flange until the friction rings of the clutch disk and of the base block intimately contact, whereupon the clutch disk will be held stationary. The gear 30 on the shaft 14 now rotates the pinions 29 and 27 and pulley 18. The speed of the shaft will be stepped down in this position of the parts so that the driving pulley will rotate at a considerably slower speed than the shaft.

From the above description it will be seen that I have provided an extremely durable and simple two-speed clutch which will be effective in operation under various conditions of service.

What is claimed, is:—

1. The combination of a driving shaft, two frictional members, one of said members being stationary and the other being revolubly and shiftably mounted on said shaft, a pulley on said shaft having an internal gear, a shifting means having a screw thread connection with said stationary member and engaging said shiftable member, and adapted to be rotated to shift said shiftable member selectively into engagement with said pulley or said fixed member, a fixed gear on said shaft, and a train of meshing idler gears carried by said shiftable member meshing with and forming a speed reducing mechanism between said gear and said pulley gear.

2. The combination with a driving shaft, of two friction members, one of said members being stationary upon and the other being revolubly and shiftably mounted upon said shaft, a pulley on said shaft having an internal gear, an annular shifting means having an external screw thread connection with said stationary member and having internal flanges engaging with opposite sides of said shiftable member, a lever connected to said shifting means for rotating said means whereby to shift said shiftable member selectively into engagement with said pulley or said fixed member, a fixed gear on said shaft disposed within said pulley, and a train of meshing idler gears carried upon said shiftable member meshing with and forming a speed reducing mechanism between said fixed gear and the internal gear 14 of said pulley.

In testimony whereof, I affix my signature, in the presence of two witnesses.

AMES A. OLSON.

Witnesses:
F. H. DRATH,
A. J. BERGLING.